No. 699,235. Patented May 6, 1902.
W. F. RAMSEY & H. E. POOL.
COMBINED HAY LOADER AND PRESS.
(Application filed Apr. 11, 1901.)
(No Model.) 4 Sheets—Sheet 1.

Witnesses

Inventors
W. F. Ramsey
H. E. Pool
By H. B. Wilson & Co.
Attorneys

No. 699,235. Patented May 6, 1902.
W. F. RAMSEY & H. E. POOL.
COMBINED HAY LOADER AND PRESS.
(Application filed Apr. 11, 1901.)

(No Model.) 4 Sheets—Sheet 4.

Witnesses
Inventors
W. F. Ramsey
H. E. Pool
By Attorneys

UNITED STATES PATENT OFFICE.

WILLIAM F. RAMSEY AND HUGH E. POOL, OF MOUNTVIEW, OKLAHOMA TERRITORY.

COMBINED HAY LOADER AND PRESS.

SPECIFICATION forming part of Letters Patent No. 699,235, dated May 6, 1902.

Application filed April 11, 1901. Serial No. 55,376. (No model.)

*To all whom it may concern:*

Be it known that we, WILLIAM F. RAMSEY and HUGH E. POOL, citizens of the United States, residing at Mountview, in the county of Washita and Territory of Oklahoma, have invented certain new and useful Improvements in a Combined Hay Loader and Press; and we do declare the following to be a full, clear, and exact description of the invention, such as will enable others skilled in the art to which it appertains to make and use the same.

This invention relates to certain improvements in a combined hay loader and press, and has for its object the production of mechanism of simple and effective construction for elevating the hay as it is cut in the field and conveying it to the baling-chamber to be compressed into bales, a further object being to yieldingly support the raking and conveying mechanism to prevent injury thereto when the rake encounters an obstruction or is passing over irregular surfaces and to maintain said rake in yielding contact with the ground-surface.

The apparatus is designed to be driven along the field in rear of the mower and to take up the hay from the ground as it is cut by the mower and compress it into bales, the bales as formed being discharged from the apparatus onto the ground, from which they may be taken up and loaded into wagons and carried to any suitable point of deposit for storage or sale.

With this and other ends in view, which will appear as the nature of the invention is better understood, the invention consists in certain novel features of construction, combination, and arrangement of parts in a rake attachment and conveyer for a hay loader and press of this character, as will be hereinafter more fully described and particularly pointed out in the appended claims.

Figure 1:
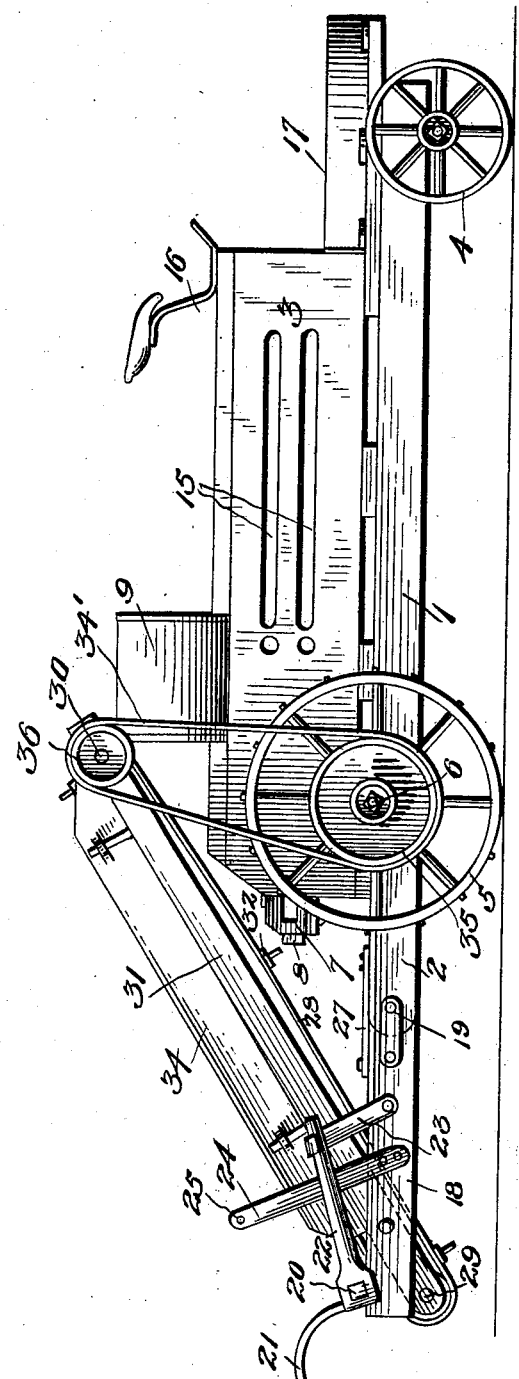
Figure 2:
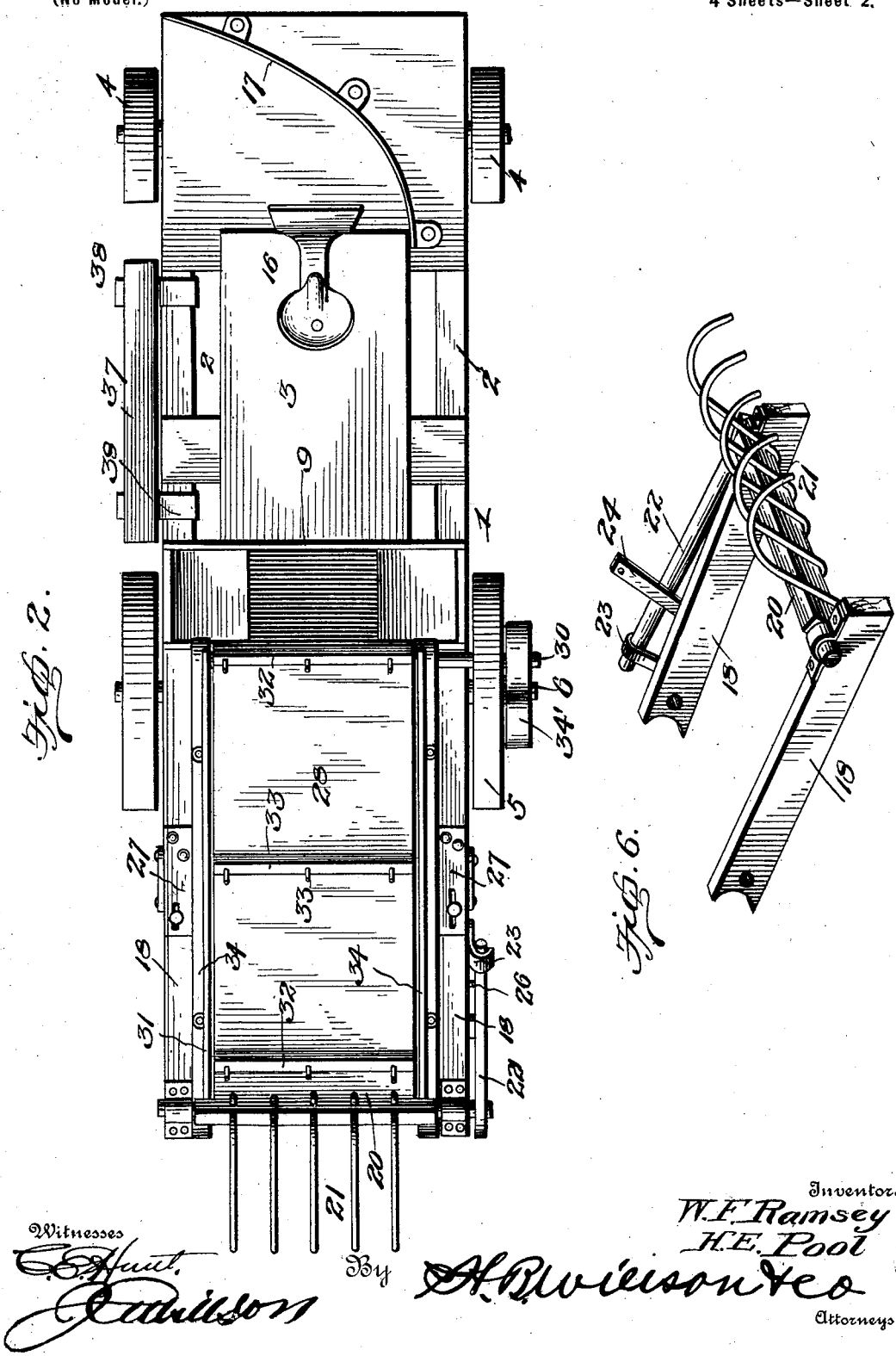
Figure 3:
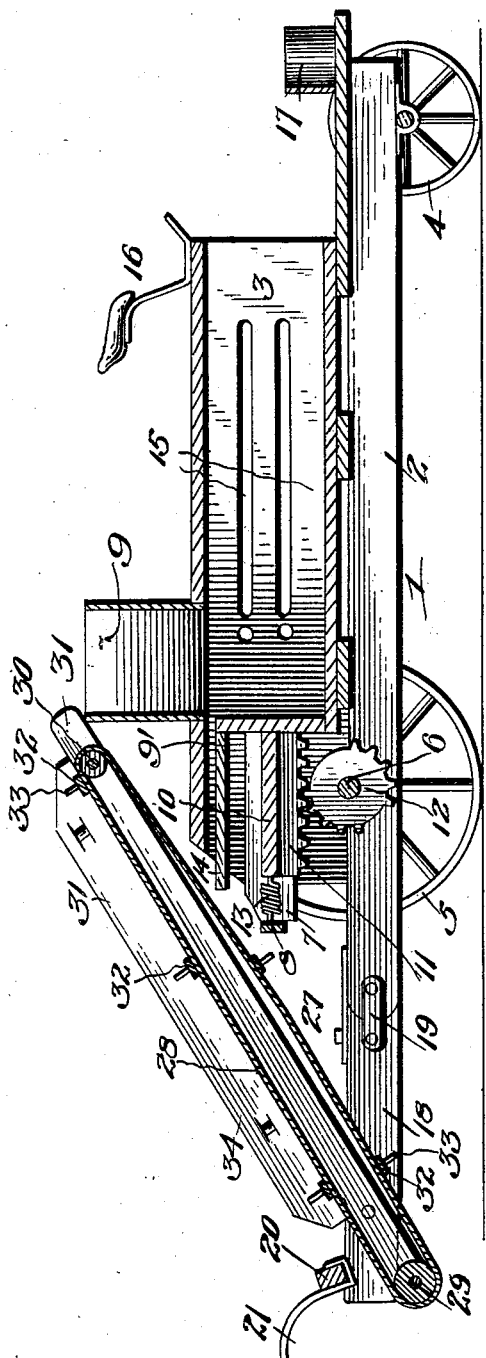
Figure 4:
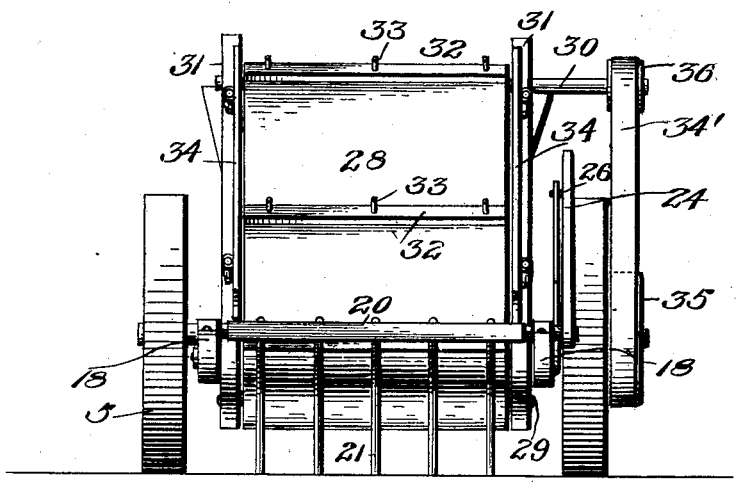
Figure 5:
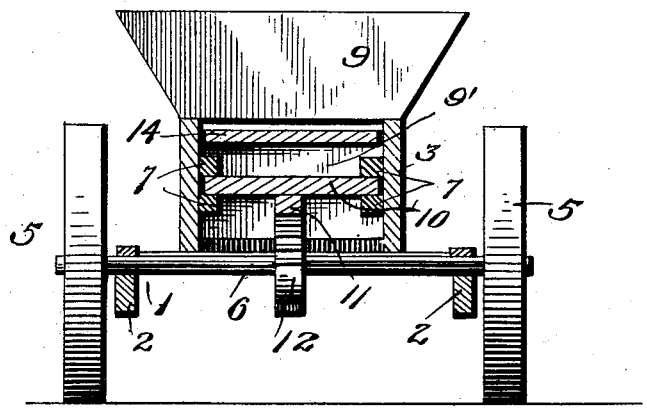

In the drawings hereto annexed and forming a part of this specification, Figure 1 is a view in elevation of one side of a combined hay loader and press constructed in accordance with our invention. Fig. 2 is a top plan view. Fig. 3 is a vertical longitudinal section. Fig. 4 is a rear end elevation. Fig. 5 is a cross-section through the apparatus on a line centrally through the hopper and baling-chamber, and Fig. 6 is a detail perspective view of the rake and rake-frame of the apparatus.

Referring now more particularly to the drawings, the numeral 1 represents a wheeled carrier-frame composed of side sills 2, on which is mounted a platform, which may be open or closed, as preferred, and which supports the baling box or chamber 3. To the forward end of this frame a draft-tongue or other draft attachment may be applied for the attachment of draft-animals for hauling the apparatus, and the front wheels 4 are mounted in the usual manner upon a swiveled axle for steering purposes. The rear supporting-wheels 5 of the apparatus are spurred or stepped to secure a firm engagement with the ground and are mounted upon a transverse shaft 6, which serves as a drive-shaft for transmitting motion to the plunger of the baling mechanism, as hereinafter described.

The baling box or chamber 3 is open at each end, the forward end constituting the discharge end, through which the completed bale is passed, and at the rear end of said chamber is a guide-frame 7, composed of oppositely-disposed grooved or slotted side members connected at their rear ends by a cross-bar 8. In advance of this frame the baling-chamber is provided in its top with a mouth or feed-opening, with which communicates a hopper 9 into which the hay to be compressed is deposited by the automatic loading mechanism. The plunger 9' reciprocates in the baling-chamber 3 and is provided with a bar 10, which slides within the said guide-frame 7. To the under side of this bar is connected a rack 11, which is exposed through an opening in the bottom of the baling-chamber and meshes with a mutilated gear-wheel 12 on the shaft 6. This wheel is provided with alternate toothed and blank portions so disposed as to mesh with the rack to force the plunger forwardly and then to disengage the rack to allow it to be retracted, the plunger being twice retracted upon each revolution of the drive-shaft 6. A spiral spring 13 connects the cross-bar 8 of the guide-frame 7 with the rear end of the guide-bar 10 of the plunger and retracts the plunger upon the release of the rack-bar thereof from each set of gear-teeth on the gear-wheel 12. In the operation of the apparatus as the axle 6 revolves forwardly one set of gear-teeth on the gear-wheel 12 come in mesh with the rack 11 and forces the plunger forwardly to compress the hay. When the shaft has completed one-quarter of a revolution, the said set of gear-teeth moves out of mesh with the rack and the following blank portion of the gear-wheel comes below the rack, whereby said rack is left free to be retracted by the spring 13. The continued motion of the shaft then brings the other set of gear-teeth and the other blank space of the gear-wheel into operative position, and the operation above described forcing the plunger forwardly and retracting it is repeated, whereby the hay fed from the hopper into the baling-chamber is forced forwardly and compressed in a manner readily understood. To the plunger is connected a rearwardly-projecting cut-off plate 14, which when the plunger moves forwardly gradually closes the mouth or opening in the baling-chamber through which the hay is fed thereto from the hopper to prevent the further feed of hay into said baling-chamber until the plunger is retracted. The baling box or chamber is provided in its sides with slots 15, through which the binding cords or wires are passed, and at its forward end supports a driver's seat 16, which may be of any preferred construction. The bales discharged from the forward end of the baling-chamber fall upon a solid portion of the platform of the frame 1 and are deflected by a curved shield or deflector-plate 17, which guides them toward the left side of the machine, from which they drop down upon the ground.

At the rear of the frame is located the hay-loading mechanism, which comprises in its organization a rake for collecting the hay as the apparatus is drawn along the ground and a conveyer for elevating the hay therefrom to the hopper 9. The rake mechanism is composed of a supporting-frame consisting of a pair of side bars or arms 18, pivoted, as at 19, to the rear ends of the sills 2 and carrying at their rear ends journals in which the transverse shaft 20 of the rake 21 is mounted. The shaft 20 is adapted to be oscillated to throw the rake-teeth into and out of contact with the ground by means of a hand-lever 22, and a pivoted hook 23 is provided upon the rake-frame to engage said handle when the latter is thrown forwardly to hold the rake elevated above the surface of the ground when it is not desired to employ it. A retainer-bar 24 is rigidly secured to the rake-frame and is provided at its free end with a keeper or opening 25 to receive a pin or projection 26 on the hand-lever 22, whereby said hand-lever may be held against movement when thrown rearwardly to maintain the rake-teeth in contact with the surface of the ground. In order to allow the rake-frame to yield vertically to compensate for irregularities of surface while maintaining the rake constantly in contact with the ground and to also yieldingly support the conveyer-frame, hereinafter described, flat or ribbon springs 27 are rigidly secured at one end of the rear ends of the sills 2 and are adjustably secured at their other ends to the bars or arms 18 of the rake-frame, so as to exert a downward pressure upon said arms and to be adjusted to vary their resistance to the upward movement of the arms. These springs allow the rake-frame and conveyer-frame to yield or give vertically when the rake encounters an obstruction or is passing over irregular surfaces and then automatically retract the frames and rake to operative position to constantly maintain the rake-teeth in contact with the ground-surface and prevent injury to the rake and conveyer. The hay collected by the rake as the apparatus moves forwardly is taken up by an endless belt or apron 28 and conveyed to the hopper 9, from which it passes into the baling-chamber to be compressed. This belt or apron 28 is mounted upon transverse shafts 29 and 30, journaled in the upper and lower ends of the conveyer-frame bars 31 and is provided with transverse cleats or slats 32, having spurs or projections 33, which pick up the hay confined by the rake and carry it forward and upward to the hopper. Guard-rails 34 are mounted upon the sides of the conveyer-frame to prevent any of the hay carried upward by the conveyer from dropping from the same to the ground and becoming wasted. Motion is communicated from one of the drive-wheels 5 of the drive-shaft 6 to the conveyer through the medium of a band 34', which passes around a pulley or band-wheel 35 on said wheel or shaft and around a band-wheel or pulley 36 on the upper transverse shaft 30, journaled in the conveyer-frame. Chain-and-sprocket mechanism may of course be substituted for the belt and pulleys. A step or footboard 37 is mounted upon the left-hand side of the frame by means of hooks 38, detachably engaging the adjacent side sill 2. On this step or footboard the operator in charge of the loading and baling mechanism stands. From his position on this footboard the operator may keep the hopper clear of surplus hay and at the same time attend to the feeding and tying of the binding cord or wires for the bales.

In operation the apparatus is driven along the field in rear of the mower which cuts the grass or hay and in the line of the swath and the rake is then let down in contact with the ground to gather up the hay. The hay gathered up by the rake is carried upwardly from the ground to the hopper, from which it feeds through the mouth or opening of the baling-chamber into said chamber in advance of the plunger for compression. The operation of the plunger in compressing the hay has been heretofore described, and upon the discharge of the completed bale from the baling-chamber the pressure of the following hay under compression forces said bale outwardly and into contact with the deflector-plate 17, which guides it to one side of the machine, from which it drops down onto the ground. When the operation of baling is completed, the bales are taken up from the ground and transported in wagons from the field to the barn or other place of deposit. When the apparatus is being moved from one field to another or is out of use, the rake may be elevated by throwing the hand-lever 22 forwardly and engaging it with the pivoted hook 23. The baling-chamber and rake-frame which supports the conveyer and its frame are removably mounted upon the carrier-frame 1, so that when desired they may be detached therefrom and the carrier-frame employed as a platform truck or wagon. By mounting a wagon-bed upon this frame an efficient form of wagon will be provided, which may be employed for general use upon the farm between haying seasons.

From the foregoing description, taken in connection with the accompanying drawings, the construction, mode of operation, and advantages of the invention will be readily understood, and it will be seen that it provides an efficient, convenient, and labor-saving apparatus for the purpose stated.

Changes in the form, proportion, and minor details of construction may be made within the scope of the invention without departing from the spirit or sacrificing any of the advantages thereof.

Having thus fully described our invention, what we claim as new, and desire to secure by Letters Patent, is—

1. In a rake attachment for a combined hay loader and press, the combination, with a wheeled supporting-frame comprising side beams, of a rake-frame comprising parallel side bars pivoted to the rear ends of said beams, a rake or gatherer pivoted to the side bars, and springs secured to the beams and side bars for normally forcing the rake-frame down and holding the rake in yielding engagement with the surface of the ground, substantially as described.

2. In a rake attachment for a combined hay loader and press, the combination, with a wheeled supporting-frame comprising side beams, of a rake-frame composed of side bars pivotally connected to the rear ends of said beams, plate-springs secured to the bars and beams and normally tending to force the bars downward to maintain the rake in yielding engagement with the surface of the ground, a pivoted rake or gatherer carried by said bars, and means for holding the rake into and out of working position, substantially as described.

3. In a rake attachment and conveyer for a combined hay loader and press, the combination, with a wheeled frame comprising side beams suitably connected, of a gatherer-frame comprising side bars pivotally connected to the rear ends of the side beams of the wheeled frame, a conveyer-frame pivoted at its lower end to the gatherer-frame and suitably supported at its upper end, an endless conveyer mounted in said conveyer-frame, springs connected to the rear ends of the side beams of the wheeled frame and to the side bars of the gatherer-frame and acting as yielding supports for the conveyer-frame and as means for yieldingly maintaining the rake in contact with the surface of the ground, and a rake or gatherer supported by said gatherer-frame, substantially as described.

In testimony whereof we have hereunto set our hands in presence of two subscribing witnesses.

WILLIAM F. RAMSEY.
HUGH E. POOL.

Witnesses:
ROY M. SOHN,
HENRY SCHAEFER.